Figure 1:
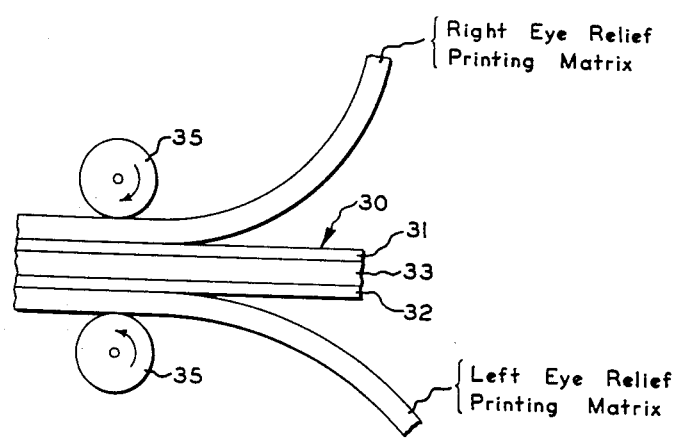

April 5, 1960

W. H. RYAN ET AL 2,931,296

PROCESSING OF MOLECULARLY ORIENTED SHEETS OF TRANSPARENT, LINEAR, HIGH MOLECULAR WEIGHT, HYDROXYL-CONTAINING POLYMERS TO IMPROVE THE DYEING QUALITIES THEREOF

Filed May 21, 1954

INVENTORS
William H. Ryan
and
Vivian K. Walworth

BY Brown and Mikulka
and
Moncure B. Berg
ATTORNEYS

United States Patent Office 2,931,296
Patented Apr. 5, 1960

2,931,296

PROCESSING OF MOLECULARLY ORIENTED SHEETS OF TRANSPARENT, LINEAR, HIGH MOLECULAR WEIGHT, HYDROXYL - CONTAINING POLYMERS TO IMPROVE THE DYEING QUALITIES THEREOF

William H. Ryan, Billerica, and Vivian K. Walworth, Concord, Mass., assignors to Polaroid Corporation, Cambridge, Mass., a corporation of Delaware Application May 21, 1954, Serial No. 431,396

8 Claims. (Cl. 101—149.1)

This invention relates in general to practices useful for forming light polarizers of the character comprising a molecularly oriented plastic sheet which has a dichroic dye or dyes predeterminedly incorporated therein, as well as to procedures which facilitate the dyeing of such molecularly oriented plastic sheets with a dichroic dye or an isotropic dye, i.e., a dye which lacks dichroism. More particularly, the invention is concerned with methods for pretreating sheeting of this nature for enhancing the dyeing qualities thereof to the end of obtaining an improved dyed product and specifically is concerned with pretreatment procedure for molecularly oriented plastic sheet whereby to obtain improvements in the image qualities of dye images formed therein by the predetermined application of dichroic dyes as well as isotropic dyes to said sheet.

Objects of the invention reside in the pretreatment of a sheet of a transparent, orientable, linear, high molecular weight, hydroxyl-containing polymer which has the molecules thereof substantially oriented to the end of improving the dyeing qualities of said sheet, and particularly to a method carried out preparatory to applying an aqueous solution of a dye to the sheet which comprises uniformly wetting said sheet with an aqueous iodide solution, i.e., a solution containing iodide ions; to provide processes of this nature wherein excess pretreating solution is removed from the sheet after permeation of said iodide ions into said sheet; and to provide processes which in general improve the receptivity of molecularly oriented sheets of polymers of the character set forth for dichroic dyes and also isotropic dyes and which also result in improving the pictorial quality of dye images formed therein by the predetermined dyeing of said sheet.

Other objects of the invention are concerned with the reproduction of light-polarizing dye images in a sheet of a transparent, orientable, linear, high molecular weight, hydroxyl-containing polymer, which has the molecules thereof substantially oriented, by the transfer of dye from a relief matrix contacted with a surface of the sheet or by the successive transfer of different colored dyes by the successive application to said surface in registered contact therewith of two or more of such printing matrices, and is especially concerned with providing processes for improving the dyeing qualities of said sheet wherein the sheet, prior to the application of each printing matrix thereto, is wetted with an aqueous iodide solution, following which excess pretreating solution with which the sheet is wetted is removed and the sheet, while still wet, is positioned for the pressure application thereto of one of said printing matrices; and as a further object, the invention is particularly concerned with improvements of processes of this nature for forming a light-polarizing dye image of a stereoscopic pair of images in each of a pair of sheets of a transparent, orientable, linear, high molecular weight, hydroxyl-containing polymer, particularly polyvinyl alcohol sheets, which are arranged in superposed relation to each other and which have their respective molecules substantially oriented and are positioned so that the orientation axis of one of said sheets is at 90° to the orientation axis of the other of said sheets.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

Figure 2:
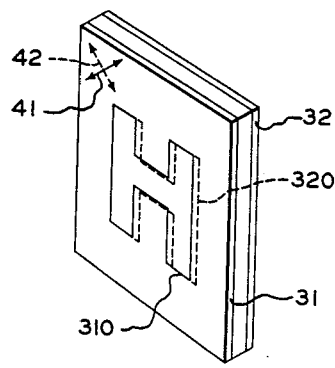

For a fuller understanding of the nature and objects of the invention, reference should be had to the following detailed description taken in connection with the accompanying drawing wherein:

Figure 1 is a diagrammatic illustration showing the manner of forming pairs of superposed light-polarizing stereoscopic dye images in stereoscopic film stock by the application to each side of the film stock of a printing matrix which contains, as a relief image, one of a stereoscopic pair of images to be printed and which is wet with a dichroic dye; and Fig. 2 is a diagrammatic perspective view of a stereoscopic color print produced on the stereoscopic film stock by the procedure illustrated in Fig. 1.

One practice for producing a light polarizer is to adsorb a dichroic dye in a transparent, molecular oriented, linear, high molecular weight, hydroxyl-containing polymer of which a preferred example is polyvinyl alcohol. Wherever a dichroic dye is adsorbed in a molecularly oriented plastic sheet of this nature, it renders the sheet light polarizing. Thus, oriented plastic materials of the nature previously described are, in general, useful to provide dye polarizers and are particularly suited as a medium for providing stereoscopic, light-polarizing prints in color.

Plastic sheet, such as polyvinyl alcohol and the like, when in unoriented condition, is, in general, easily dyed by wetting the sheet with aqueous dye solution. However, molecular orientation makes it more difficult to penetrate the plastic sheet with dye solutions. Hence, a primary concern of the present invention is to provide treatment for sheets, strips or films of transparent, orientable, linear, high molecular weight, hydroxyl-containing polymers which is designed to improve the dyeing thereof, and especially to provide treatment which leads to the formation therein of dye images of enhanced quality by preconditioning said sheets, strips or films prior to and in preparation for the application of dye thereto.

With these aims and objects in mind, some explanation of the nature of stereoscopic print material and the manner of forming light-polarizing images therein by the predetermined application of dichroic dyes to the material will lead to a fuller understanding of the present invention.

In this regard, a suitable medium in which superposed, light-polarizing, stereoscopic, left- and right-eye images may be formed is provided by the stereoscopic film stock 30 illustrated in Fig. 1 as comprising a laminar structure having two thin and transparent surface layers 31 and 32 mounted upon the opposite sides of a transparent support 33. The surface layers 31 and 32 are thin sheets of a transparent, molecularly oriented, high molecular weight, hydroxyl-containing polymer of which a preferred example is polyvinyl alcohol, while the support 33 is any suitable transparent and substantially water-impermeable plastic such as cellulose acetate butyrate or cellulose triacetate.

The layer 31 has its molecules so oriented that the transmission or polarizing axis of the layer will be at 45° to the edge of the film stock 30, while the layer 32 has its molecules so oriented that the transmission or polarizing axis of the layer will also be at 45° to the edge of the film stock but will make an angle of 90° with the transmission axis of the layer 31. A preferred orientation is indicated by the arrows 41 and 42 in Fig. 2, which schematically illustrates the stereoscopic film stock 30 after image formation therein and shows the front layer 31 with transmission axis 41 extending upwardly to the right for receiving the right-eye picture of a stereoscopic pair and the rear layer 32 with its transmission axis extending upwardly and to the left for receiving the left-eye stereoscopic picture.

Film structures of this general nature are disclosed in U.S. Patents Nos. 2,289,714, 2,289,715 and 2,315,373. The film stock 30 provides a transparent structure useful as motion picture film or cut film. Additionally, the film stock 30 may be mounted upon an opaque, non-film polarizing, reflecting base and used for the formation of light-polarizing reflection prints. Stereoscopic image pairs formed in the film stock 30 will be located in superposed relation to each other.

Image formation in the film stock 30 is carried out by printing with washoff relief matrices in each of which a solution of a suitable dichroic dye has been imbibed. The washoff relief matrices are prepared from photographic originals or duplicates thereof by conventional practices and, after imbibition of a solution of dichroic dye therein, are pressed into contact with the outer faces of the layers 31 and 32 to transfer portions of said solution to each of said layers.

Two sets of printing matrices, one for the right-eye image and one for the left-eye image, are used for the positive reproduction of a stereoscopic pair of images in suitable film stock such as the stock 30. For color positives, each set of matrices comprises two or more individual relief matrices which each bear a positive color separation record of one image of the stereoscopic pair of images to be reproduced. The individual matrices in a set used for color reproduction are printed successively on the stereoscopic film stock, for example, the matrices representative of the cyan, magenta and yellow components of the color image to be reproduced may be applied to the film stock in the order just named.

A convenient means for simultaneously printing on opposite sides of the film stock 30 is schematically illustrated in Fig. 1 wherein the film stock 30 with a right-eye printing matrix and a left-eye printing matrix superposed on opposite sides thereof is shown as being passed between two rotating pressure-applying rolls 35 which cause the matrices to be pressed into intimate contact with the outer molecularly oriented layers 31 and 32 of the film stock.

A print or product resulting from the ultization of the procedure illustrated in connection with Fig. 1 is diagrammatically shown in Fig. 2 wherein film stock 30 is illustrated as containing a right-eye stereoscopic image 310 in the molecularly oriented layer 31 and a left-eye stereoscopic image 320 in the molecularly oriented layer 32. Image 310 is shown in full lines while image 320 is shown in dotted lines. For the purposes of simplification, the print shown in Fig. 2 has been considered as derived from a pair of stereoscopic records of the letter H and, in accordance with the process heretofore described, may be considered as providing a full color stereoscopic print.

Viewing is carried out by observing these light-polarizing images 310 and 320 through polarizing filters located in front of each eye of the observer with the transmission axes thereof positioned at 90° to each other. Additionally, the light-polarizing filters are so positioned with respect to the light-polarizing images in the film 30 that each has its respective polarizing axis crossed or at 90° to the polarizing axis of the image to be observed therethrough. In this way, each eye sees substantially only the image intended for it.

The molecular orientation of a plastic sheet is customarily carried out by stretching the sheet in the presence of heat. Stretching is conducted by the application to the sheet of opposed tensional forces. As it will be well understood, the result of such stretching is to cause orientation of the molecules of the sheet in a direction which is substantially parallel to the direction of application of the opposed stretching forces. The higher the degree of this stretching, the more complete will be the molecular orientation.

The effect of stretching on plastic sheeting may be determined empirically by printing a plurality of unit circles at intervals along a surface of the sheeting in its unstretched condition. When this sheeting is then stretched, it will be found that these circles have been converted into ellipses having major axes which extend in a direction generally parallel to the direction of application of the opposed stretching forces. The ratio of the major axis of such an ellipse to its minor axis is known as the axial ratio and is a measure of the degree of stretch imparted to the sheet. The higher this axial ratio, the higher the degree of stretch.

High axial ratios are desirable for the purpose of increasing the efficiency of the sheet polarizer. The efficiency of a sheet polarizer is determined by its density ratio, sometimes referred to as the dichroic ratio. In general, the higher the axial ratio, the higher the density ratio.

One effect of stretching a plastic sheet, such as polyvinyl alcohol, by practices such as those described, is to cause the sheet to develop a resistance to dissolution in aqueous solution at given temperature. In general, this decrease in solubility of the plastic material in aqueous solution is a function of the degree of its molecular orientation, i.e., the greater the axial ratio, the greater the insolubility of the sheet. Such decrease in the solubility of the plastic material affects the ability of an aqueous solution to permeate a sheet of the same and, as previously indicated, affects the printing in the sheet, by dye transfer processes, of light-polarizing images. Because of this condition existing in highly oriented plastics, i.e., plastic sheeting having an axial ratio of 3 and higher, it becomes desirable to improve its dyeing qualities whereby to permit the printing therein of dye images having densities suitable for commercial photography, especially for motion pictures where densities of 2.7 are usually considered as an acceptable minimum requirement.

Improvements in the dyeing characteristics of the molecularly oriented sheet are carried out by pretreatment thereof, prior to the transfer printing of dye images therein, by imbibing into the sheet a solution of one or more reagents which function to effect the desired improvement. Application of the pretreating solution is by contact with one surface of the sheet or by immersion of the sheet in the solution. One function of pretreatment is to increase the receptivity of the molecularly oriented plastic sheet or dye whereby to increase the quantity of dye depositable or pentrable into a unit portion of the sheet with consequent increase in attainable dye density. Also, pretreatment should permit an increase in the speed or rate of dye transfer and preferably should assist in reproduction of the definition of the matrix image in the dye image printed in the sheet.

One method heretofore employed for preparing stereoscopic film stock such as the film stock 30 for the transfer printing of dye images therein has been to pretreat the stock with aqueous solutions of various alkalies, such as sodium hydroxide, or monoethanolamine or the like, as well as combinations thereof. While alkaline pretreatment is successful to obtain the transfer of dye in the quantity needed to provide the density desired for printed images, it is objectionable from the standpoint that solutions of this character, because of their highly caustic nature, are dangerous to handle and consequently are considered as hazardous, particularly where employed in continuous processing machines. Furthermore, alkaline pretreating reagents have a tendency to cause lateral diffusion of the dye solution in the film stock and are, in general, unsuited as a mechanism for causing a substantially faithful reproduction in the transfer image of the definition possessed by the matrix image.

Although alkaline pretreatment does not lead to the formation in sheets of oriented, hydroxyl-containing polymers of dye images possessing a resolution acceptable for motion picture work, i.e., a resolution of 40 lines per millimeter, it is suited for use in the production of relatively large size prints which are handheld for viewing. Prints of this nature have no stringent requirements in regard to image definition, a resolution of 15 lines per millimeter being generally considered as acceptable for 8" x 10" prints which are held by hand when viewed.

Instead of alkaline solutions, it would be preferable to provide pretreatment by the employment of solutions which are noncaustic and generally neutral in character and which further lead to the production in oriented plastic sheets of dye images possessing the most desired properties.

We have discovered that substantially any water-soluble iodide provides a pretreating reagent which more nearly approaches the just stated ideals. In general, any water-soluble iodide, when employed in aqueous solution for pretreating molecularly oriented, hydroxyl-containing polymers of the character with which this invention is concerned, is effective as a means for obtaining desired dye density by transfer. However, iodides, with certain exceptions to be hereinafter specifically noted, while permitting the formation in the film stock of dye images possessing an overall quality which is better than that achieved by employing the heretofore mentioned alkalies as prewets, appear to contribute little towards assisting good reproduction in the printed image of the matrix image definition.

As pointed out in our copending application Serial No. 431,341, filed May 21, 1954, for Processing of Molecularly Oriented Sheets of Transparent, Linear, High Molecular Weight, Hydroxyl-Containing Polymers to Improve the Dyeing Qualities Thereof, iodide salts which contain a bivalent metal constituent selected from the metals in class II of the periodic table and particularly beryllium iodide, magnesium iodide and cadmium iodide provide pretreatment solutions which not only permit the attainment of the desired density for the printed dye image while speeding up dye transfer rate but also promote the formation in the sheet of dye images of the high definition desired in the case of motion picture images. For example, assuming a matrix image having a resolution of 40 lines per millimeter or more, pretreatment of oriented sheets with aqueous solutions containing iodide ions and bivalent metal ions from the class of beryllium, magnesium and cadmium has resulted in the production of dye images in the oriented sheets which each possess a resolution comparable to that of the matrix image from which they were printed.

On the other hand, iodide pretreating solutions such as sodium iodide, ammonium iodide, potassium iodide and rubidium iodide, while leading to the formation of images having the desired dye density, have not by themselves been greatly effective to assist in reproduction of the matrix image definition although, as noted, the overall quality of dye images resulting from pretreatment with the last-named iodides has been better than that resulting from pretreatment with the heretofore mentioned alkalies.

Iodides other than those possessing a bivalent metal constituent from class II of the periodic table are, however, useful as pretreating solutions for processing handheld prints and are further useful for reproducing high matrix image resolution of 40 lines or more per millimeter when used in conjunction with oriented plastic sheets which have a mordant or dye precipitant or other reagent incorporated therein for the purpose of holding dye introduced into the sheet against lateral diffusion.

It is not clearly understood why pretreatment with aqueous iodide solutions causes the heretofore described effects. Seemingly, the iodide ion in such a solution functions to assist in carrying out dye transfer, including increasing the quantity of the dye per unit portion deposited, as well as the rate of the transfer, but does not materially contribute to improvements in definition reproduction. In the case of the bivalent metal iodides having a metallic constituent selected from the metals of class II of the periodic table, it would seem that the bivalent metal ions in such a solution function to improve definition reproduction. On the other hand, it appears that ions such as sodium or ammonium or potassium present in solutions of the corresponding iodides exert a considerably less effect on reproduction of the matrix image definition than the heretofore mentioned bivalent metal ions, although the utilization of any iodide prewet permits the achievement of an overall image quality better than that produced by alkaline pretreating.

As heretofore indicated, the employable iodides are those of a water-soluble nature. By water-soluble iodides, we mean those iodides which are sufficiently water soluble to form aqueous solutions of 1% and high concentrations. Certain iodides lack stability in that they are subject to relatively rapid decomposition in aqueous solutions. However, most iodides are sufficiently stable in aqueous solution to permit several successive treatments of film stock therewith to the end of carrying out multicolor printing and in such instances it is usually possible to replenish the pretreating solution with fresh iodide salt. While all iodide solutions are substantially noncaustic and none possess objectionable alkalinity, certain iodides, for example, beryllium iodide, are of toxic nature and are consequently not as preferred as iodides which provide nontoxic solutions.

Pretreating solutions are formed by directly adding a water-soluble iodide salt, or an iodide salt and a salt other than iodide but which possesses a bivalent metal constituent of the class described, to an appropriate volume of water. The molecularly oriented plastic sheet is treated by immersing the sheet in the preheating solution or by maintaining the solution in contact with the surface of the sheet for a time necessary to successfully carry out the desired preconditioning.

Dye images possessing densities of 2.7 and higher as well as improved overall image quality have been formed in molecularly oriented plastic sheets of the character described following prewetting or preconditioning treatment of the sheets for one minute in aqueous solutions of from 1 to 5% concentration of iodide salts such as ammonium iodide, sodium iodide, potassium iodide and rubidium iodide as well as in solutions of similar concentration containing iodide ions and ions of a bivalent metal from the class consisting of beryllium, cadmium and magnesium, while holding the solution at a temperature of approximately 70° F. Treatment of this character has led to the production of acceptable individual color component light-polarizing images of appropriate density and overall quality with cyan, magenta and yellow dyes as well as a three-color print formed by successively printing in appropriate register and from relief matrices each component image of a sheet of molecularly oriented plastic.

Other examples of suitable water-soluble iodides are: barium iodide, calcium iodide, cesium iodide, chromous iodide, cobaltous iodide, hydrogen iodide, lithium iodide, nickelous iodide, strontium iodide, titanium tetraiodide and zinc iodide.

While the iodides heretofore named have all been inorganic iodides, the scope of the invention embraces the use of organic iodides, examples of which include methyl iodide and methylene iodide. In general, however, organic iodide salts lack the necessary water solubility and consequently are not as preferred as the inorganic iodides.

It is difficult to name a preferred concentration, other than within the limits heretofore noted, for an iodide pretreating solution due to a considerable number of factors. In this regard, the presence of an iodide or iodide ions, even in small concentration, is beneficial for the purposes desired. As a general formulation, it may be stated that the desired results, particularly with reference to obtaining high dye densities, have been attained with aqueous iodide solutions of from 1% to 5% by immersion of molecularly oriented polyvinyl alcohol sheet of high axial ratio in a solution for a period of one minute while holding the solution at a temperature of about 70° F., i.e., room temperature. Increase in the iodide concentration to provide a 10% solution while maintaining the treating time and temperature at one minute and 70° F., respectively, appears to give but little improvement in the quality of the image printed except for possibly speeding up the transfer rate and giving some slight increase in the dye density obtained.

Another factor affecting the concentration of the pretreating solution resides in its use in heated condition, i.e., where the temperature of the solution is elevated above room temperatures. As will be hereinafter shown, such procedure is desirable from the standpoint of improving image quality and speeding up the printing time. Where heated pretreating solutions are used, it is possible to employ lower concentration to obtain satisfactory results. Still another factor affecting concentration is agitation of the pretreating solution during immersion of the oriented sheet therein.

In further regard to the pretreating solution, it may be noted as well known that many salts, including those named herein, will, under appropriate conditions involving temperatures and concentrations, precipitate dye from an aqueous dye solution when the salt is added to the solution of the dye. This precipitation is known as a salting out effect and results in the displacement of the dye from solution by the salt. Obviously, such a condition is to be avoided in dye transfer printing. A high salt content in the pretreated film stock favors this undesired salting out of dye from the dye solution in the printing matrix. It should also be recognized that other factors enter into salting out effects. For example, a high concentration of dye in the dye solution in the printing matrix favors salting out conditions for a given salt content of the pretreated film stock while carrying out the transfer printing at high temperatures is in general a deterrent to salting out effects.

In general, it is preferable to carry out the preconditioning of molecularly oriented sheeting with solutions at temperatures of above normal room temperature. Not only does the use of elevated temperatures shorten pretreatment time but it also shortens the time required for dye transfer and additionally results in the formation of better images. The higher the temperature of an aqueous pretreating solution, the more tendency of the solution to dissolve the plastic material to which it is applied and consequently to destroy the molecular orientation thereof. On the other hand, the more highly oriented the sheet, i.e., the higher its axial ratio, the less likelihood of its dissolution by the hot pretreating solution. Molecularly oriented, hydroxyl-containing polymers, particularly polyvinyl alcohol, having an axial ratio of 6, have been subjected for one minute to aqueous pretreating solutions at about 120° F. to 125° F. without harm to the sheet.

Pretreatment solutions may be employed at higher temperatures if suitable compensations are made to care for this increase. Compensation measures include shortening the time of the application of the pretreating solutions; utilizing in the sheet a precipitatant for the plastic material of the sheet, as for example sodium sulfate in the case of polyvinyl alcohol sheet; utilizing molecularly oriented sheet of higher axial ratio; or by utilizing other appropriate measures as a means for compensation and including any combination of the specific expedients just named.

After prewet treatment, excess liquid on the surface of pretreated film stock is removed by suitable means such as by an air blast, by passing the film stock through a pair of wringer rolls or merely by suspending the film stock and permitting the excess liquid to drain therefrom. The film stock, while still wet but with excess liquid removed therefrom, is then suitably positioned for printing thereon with a printing matrix which contains an aqueous solution of a desired dye and which is pressed into contact with the surface of the film stock whereby to form the desired image in the film stock by the transfer of dye from the printing matrix.

The film stock is wetted with the pretreating solution before each printing of a subsequent component image or image pair which is printed in the film stock after the formation therein of the first component image or image pair. Such practice assures the presence in the film stock at each printing thereof of that quantity of pretreating solution needed for the formation of an image of improved overall quality. Additionally, this successive wetting of the film stock with the pretreating solution allows each printing matrix to be applied onto a wet surface to the end of maintaining overall contact between the surface being printed and the printing surface of the applied matrix whereby to reduce the formation of air bubbles therebetween as well as to avoid other undesirable conditions which tend to retard or prevent successful dye transfer and dye image formation.

In general, direct cotton dyes of an essentially elongated structure may be named as suitable for forming light-polarizing images in molecularly oriented plastic materials, and especially molecularly oriented polyvinyl alcohol. Dyes of this nature are set forth in the previously mentioned patents and, as specific examples thereof, mention may be made of Niagara Sky Blue 6B (C.I. 518) and Niagara Sky Blue (C.I. 520) for cyan; Solantine Red 8BL (C.I. 278), Solantine Pink 4BL (C.I. 353) for magenta; and Solantine Yellow 4GL (Prototype 53) and Stilbene Yellow 3GA (C.I. 622) for yellow.

While the invention has been illustrated in connection with the formation of a multicolor image, it is to be noted that the practices set forth herein are useful in providing black and white images by the employment of a black dye or mixtures of dyes which together provide black.

Although the invention has been described in connection with the pretreatment of molecularly oriented plastic materials to improve the quality of light-polarizing dichroic dye images formed therein, it will be appreciated that the invention is useful for the formation, in molecularly oriented material, of nonpolarizing images by the employment of isotropic dyes. For example, an isotropic dye or dyes are useful for providing one or more sound tracks in light-polarizing stereoscopic motion picture film.

Additionally, the practice as set forth herein may be extended for the improvement in production of sheet polarizers wherein the dichroic material is provided by a dichroic dye or mixture of dyes and is uniformly distributed throughout a molecularly oriented sheet of plastic, such as polyvinyl alcohol, which provides a light-polarizing element. The advantage of a pretreatment in this instance is primarily directed to an increase in the attainable dye density of the dye which is adsorbed in the oriented sheet material.

Throughout the specification and claims, reference has been made to orientable, linear, high molecular weight, hydroxyl-containing polymers and specifically to polyvinyl alcohol. Such reference will be understood to include polymers which have not been completely hydrolyzed, as for example partially hydrolyzed polyvinyl acetate, and is further intended to embrace polymers which may or may not have been subjected to stabilization by treatment with boric acid or other cross-linking agent, provided the polymeric material exhibits essentially the properties recognized by those skilled in the art as characteristic of commercially available polyvinyl alcohol.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. In a method of dyeing a sheet of a transparent, orientable, high molecular weight, hydroxyl-containing, vinyl polymer which has the molecules thereof oriented in a predetermined direction, the steps comprising first imbibing into said sheet throughout its area an aqueous substantially colorless pretreating solution containing iodide ions so that a substantially uniform distribution of said iodide ions exists and said sheet is caused to be predeterminedly swelled whereby to prepare said sheet for the application of an aqueous solution of a dichroic direct cotton dye to at least one surface of the sheet, and then imbibing into said sheet an aqueous solution of said dye of a predetermined color.

2. A method as defined in claim 1 of dyeing a sheet of a molecularly oriented polymer, wherein said sheet comprises polyvinyl alcohol.

3. In a method of forming both an anisotropic light-polarizing dye image and an isotropic dye image in a sheet of a transparent, high molecular weight, hydroxyl-containing, vinyl polymer having the molecules thereof oriented in a given direction, the steps comprising pretreating said sheet, prior to the transfer of either of said dye images thereto to improve the receptivity of the sheet to said dye images and to improve image definition, by imbibing into said sheet substantially throughout a surface thereof an aqueous solution of a water-soluble iodide so that a substantially uniform distribution of said iodide exists throughout the area of said sheet, then removing excess pretreating solution from said surface, and transferring from suitable printing means to a given portion of said surface an imagewise distribution of at least one aqueous dye solution comprising a dichroic direct cotton dye of a given color, and transferring from suitable printing means to another given portion of said surface an imagewise distribution of an aqueous dye solution comprising a nondichroic dye.

4. In a method of forming with a direct cotton dye a dichroic, light-polarizing image in a sheet material comprising at least a layer of a transparent, high molecular weight, hydroxyl-containing, vinyl polymer having the molecules thereof oriented in a given direction, the steps comprising pretreating said layer, prior to transferring said dye image thereto to improve at least the receptivity of the sheet to said dye image and to improve image definition, by imbibing into said layer throughout its area an aqueous, substantially colorless solution containing iodide ions so that a generally uniform distribution of said pretreating solution is provided throughout the area of said layer, removing excess pretreating solution from the surface of said layer, and transferring from a printing matrix to said layer an imagewise distribution of at least one aqueous dye solution, said solution comprising a dichroic direct cotton dye of a given color.

5. A method of forming a direct cotton dye, light-polarizing image as defined in claim 4, wherein said layer comprises polyvinyl alcohol.

6. In a method employing a set of printing matrices and a plurality of dichroic direct cotton dyes for forming a plurality of improved, multicolor, light-polarizing dye images in a sheet material comprising at least a layer of a transparent, high molecular weight, hydroxyl-containing, vinyl polymer having the molecules thereof oriented in a given direction, the steps comprising pretreating said layer, prior to transferring each of said dye images thereto to improve both the receptivity of the sheet to said dye images and to improve image definition, by imbibing into said layer substantially throughout its area an aqueous solution containing iodide ions so that a substantially uniform distribution of said ions exists throughout the area of said layer, partially drying any excess of the pretreating solution on the surface of said layer before forming each dye image thereon, and transferring in succession and in proper registration from each matrix of said set to said layer an imagewise distribution of an aqueous solution of each of said dichroic direct cotton dyes to form said improved multicolor light-polarizing images.

7. In a method employing two stereoscopic sets of printing matrices and a plurality of dichroic direct cotton dyes for forming a plurality of improved, stereoscopic, multicolor, light-polarizing dye images in a sheet material comprising two layers of a transparent, high molecular weight, hydroxyl-containing, vinyl polymer, each layer having the molecules thereof oriented substantially at 90° to those of the other, the steps comprising pretreating each of said layers prior to transferring each of said plurality of dye images thereto to improve at least the receptivity of the sheet to said dye images and to improve image definition, by imbibing into said layers substantially throughout their areas an aqueous solution containing iodide ions so that a substantially uniform distribution of said pretreating solution exists throughout the areas of said layers, partially drying the pretreating solution on the surface of each said layer before transferring a dye image thereto, transferring in succession and in proper registration from the matrices of one of said two sets to one of said layers an imagewise distribution of an aqueous solution of each of said dichroic direct cotton dyes representing one of said pair of stereoscopic images, and transferring in succession and in proper registration from the matrices of the other of said two sets to the other of said layers an imagewise distribution of an aqueous solution of each of said dichroic direct cotton dyes representing the other of said given pair of stereoscopic images.

8. A method of forming stereoscopic, light-polarizing, multicolor images as defined in claim 7, wherein each of said layers of the sheet material comprises polyvinyl alcohol.

References Cited in the file of this patent

UNITED STATES PATENTS

| | | |
|---|---|---|
| 2,070,222 | Brewster | Feb. 9, 1937 |
| 2,124,371 | Gschopf et al. | July 19, 1938 |
| 2,315,373 | Land | Mar. 30, 1943 |
| 2,328,219 | Land | Aug. 31, 1943 |
| 2,373,035 | Land | Apr. 3, 1945 |
| 2,387,914 | Kienninger | Oct. 30, 1945 |
| 2,635,535 | Jennings | Apr. 21, 1953 |